US007004617B2

(12) United States Patent
Albright et al.

(10) Patent No.: US 7,004,617 B2
(45) Date of Patent: *Feb. 28, 2006

(54) MIXER WITH DISSIMILAR AUGERS

(75) Inventors: Christopher Albright, Brodhead, WI (US); Tim Osterhaus, Stoughton, WI (US)

(73) Assignee: Kuhn Knight Inc., Brodhead, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/965,814

(22) Filed: Oct. 18, 2004

(65) Prior Publication Data

US 2005/0047273 A1    Mar. 3, 2005

Related U.S. Application Data

(63) Continuation of application No. 10/453,604, filed on Jun. 4, 2003, now Pat. No. 6,905,238.

(60) Provisional application No. 60/385,628, filed on Jun. 4, 2002.

(51) Int. Cl.
*B01F 7/24*    (2006.01)
(52) U.S. Cl. ...................... 366/299; 366/314; 366/319; 366/603; 241/101.761
(58) Field of Classification Search .................. 366/65, 366/297–300, 314, 319, 323, 603; 241/101.76, 241/101.761, 101.8, 260.1, 605
See application file for complete search history.

(56) References Cited

U.S. PATENT DOCUMENTS

| 450,237 | A |  | 4/1891 | Kam |  |
|---|---|---|---|---|---|
| 2,542,587 | A |  | 2/1951 | Smith |  |
| 3,129,927 | A |  | 4/1964 | Mast |  |
| 4,432,499 | A |  | 2/1984 | Henkensiefken et al. |  |
| 4,949,916 | A | * | 8/1990 | Wroblewski |  |
| 5,143,221 | A | * | 9/1992 | Faccia | 209/215 |
| 5,143,449 | A | * | 9/1992 | Faccia | 366/349 |
| 5,154,510 | A | * | 10/1992 | Faccia | 366/193 |
| 5,240,321 | A |  | 8/1993 | Miller |  |
| 5,429,436 | A | * | 7/1995 | Stone | 366/141 |
| 5,456,416 | A |  | 10/1995 | Hartwig |  |
| 5,462,354 | A | * | 10/1995 | Neier | 366/314 |
| 5,601,362 | A |  | 2/1997 | Schuler |  |
| 5,615,839 | A |  | 4/1997 | Hartwig |  |
| 5,647,665 | A |  | 7/1997 | Schuler |  |
| 5,803,375 | A |  | 9/1998 | Hartwig |  |
| 5,823,449 | A |  | 10/1998 | Kooima et al. |  |
| 5,863,122 | A |  | 1/1999 | Tamminga |  |
| 6,328,465 | B1 |  | 12/2001 | Tamminga |  |
| 6,409,377 | B1 |  | 6/2002 | Van Der Plas |  |
| 6,834,989 | B1 | * | 12/2004 | Tamminga | 366/143 |
| 6,863,433 | B1 | * | 3/2005 | Knight |  |
| 6,890,092 | B1 | * | 5/2005 | Tamminga | 366/314 |
| 6,905,238 | B1 | * | 6/2005 | Albright et al. | 366/299 |
| 6,929,394 | B1 | * | 8/2005 | Tamminga | 366/192 |
| 6,945,485 | B1 | * | 9/2005 | Douglas | 241/101.761 |
| 2001/0038573 | A1 |  | 11/2001 | Knight |  |

(Continued)

FOREIGN PATENT DOCUMENTS

DE    29801088 U1 *   4/1998

(Continued)

Primary Examiner—Charles E. Cooley
(74) Attorney, Agent, or Firm—Oblon, Spivak, McClelland, Maier & Neustadt, P.C.

(57) ABSTRACT

A vertical mixer is disclosed for mixing feed materials and the like. The apparatus includes at least two augers which rotate around two respective vertical axes. The augers are dissimilar relative to each other, providing an improved mixing performance. The dissimilarity can include, but is not limited to, direction of rotation and size.

9 Claims, 4 Drawing Sheets

U.S. PATENT DOCUMENTS

| | | |
|---|---|---|
| 2002/0021619 A1 | 2/2002 | Van Der Plas |
| 2002/0179757 A1 * | 12/2002 | Have et al. |
| 2003/0169639 A1 | 9/2003 | Van Der Plas |
| 2003/0223308 A1 | 12/2003 | Knight |
| 2004/0008575 A1 | 1/2004 | Albright et al. |
| 2004/0013035 A1 | 1/2004 | Tamminga |
| 2004/0090860 A1 | 5/2004 | Tamminga |
| 2005/0058017 A1 * | 3/2005 | Van Der Plas .............. 366/193 |
| 2005/0063249 A1 * | 3/2005 | Tamminga .................. 366/192 |
| 2005/0094488 A1 * | 5/2005 | Van Der Plas .............. 366/297 |
| 2005/0099885 A1 * | 5/2005 | Tamminga .................. 366/314 |
| 2005/0105390 A1 * | 5/2005 | Albright ..................... 366/314 |
| 2005/0169103 A1 * | 8/2005 | Joranlien et al. ........... 366/314 |

FOREIGN PATENT DOCUMENTS

| | | |
|---|---|---|
| DE | 19829867 A1 * | 1/2000 |
| DE | 10245001 A1 * | 4/2003 |
| DE | 10140458 A1 * | 9/2003 |
| EP | 0373503 A1 * | 6/1990 |
| WO | 03/009929 A2 * | 2/2003 |
| WO | 03/103820 A1 * | 12/2003 |

* cited by examiner

MIXER WITH DISSIMILAR AUGERS

CROSS-REFERENCE TO RELATED APPLICATIONS

This application is a continuation of application Ser. No. 10/453,604, now issued U.S. Pat. No. 6,905,238, filed Jun. 4, 2003, which claims the benefit of U.S. provisional application Ser. No. 60/385,628, filed Jun. 4, 2002. This application is related to those applications and is also related to U.S. application Ser. No. 10/453,602, now issued U.S. Pat. No. 6,863,433, filed on Jun. 4, 2003, and U.S. provisional application Ser. No. 60/385,510, filed Jun. 4, 2002. The contents of all of these applications are incorporated herein by reference in their entirety.

BACKGROUND OF THE INVENTION

1. Field of the Invention

This invention relates to augers for agricultural mixers, specifically vertical type feed mixers with multiple augers.

2. Background of the Invention

Agricultural mixers are used for mixing feed materials such as hay, silage and other nutrients including animal feed supplements and grains. These feed materials are then discharged and fed to various livestock such as cattle and dairy cows. Sometimes the mixing of such feed materials includes depositing a whole round or square bale of hay into the mixer. The mixer then cuts and processes the bale into the desired consistency before and during the mixing of the other feed nutrients.

In known mixers, there are many different configurations including horizontal augers, reel type arrangements, and vertical augers. In the vertical auger type mixers, the auger designs are generally similar. The auger generally consists of a center core on a vertical axis, with helical auger flighting wrapped around this core. The auger flighting has an overall conical appearance, being wider at the base and narrower at the top. The flighting can also consist of a series of paddles arranged in a spiral pattern. Knives are added to the flighting to help cut and process the feed materials. The wide leading edge of the flighting at the bottom of the mixer is made to travel close to the flat floor of the mixer, scooping or peeling the material upwards onto the flighting. Often a hardened bar (e.g., a grader blade) is added to the leading edge to increase the durability of the auger.

In addition to the leading edge at the base of the auger, the augers sometimes include additional bars, paddles, or sections of flighting around the base. These paddles, sometimes called "kickers" help to move the material being mixed, urging the material in a particular direction. A kicker generally consists of a relatively flat bar or plate which is lower at the front edge than at the rear edge, and can be mounted by itself or in combination with the flighting. The quantity, size, and orientation of the kickers varies depending on the type of materials, type of mixing action, mixing speed, or horsepower consumption desired. These kickers also sometimes utilize a hardened bar at their leading edge to increase the durability of the auger.

The general principle of a vertical mixer auger is to sweep materials onto the leading edge of the lower flighting section, where it is elevated upwards, sliding on top of the flighting sections, to the trailing edge of the upper flighting. As the feed material is carried upwards by the auger flighting, a void is created between the auger flighting and the sidewall of the mixer. The material from above falls downward into this void, causing a continuous boiling action of the material inside the mixer.

Some of the feed material initially swept onto the lower flighting simply flows over and off the back of the lower flighting section. This material remains stationary on the floor of the mixer until the leading edge makes a full revolution. If there is one or more kickers located around the base of the auger, the material is swept up multiple times for every revolution of the auger. Since the kickers do not directly feed the material into the flighting, the effect of these additional sweeping edges is to momentarily lift and move the material in a rotary path around the auger.

Manufacturers of vertical mixers have discovered that by changing the size, angle, and quantity of kickers, they can greatly effect the performance of the augers during mixing. For example, additional kickers at the base of the auger flighting generally increases the rotary action of the materials, and decreases the lifting action of the flighting. By positioning the kickers at an angle pushing material toward the center of the flighting, the lifting action of the flighting is increased, but the rotary action is then reduced. Additional kickers, larger kickers, and more angled kickers typically increase the horsepower required to mix, but can reduce the overall time to complete the mix. The use of additional kickers also tends to help the discharge efficiency during unloading, creating more rotary or sweeping action towards the discharge door.

In known vertical mixers that have at least two augers, the configuration of each of the augers is identical. Thus, the augers were typically designed to be a compromise between mixing efficiency, discharge efficiency, and horsepower. One disadvantage of having identical augers in the same mixer is that the interaction of the feed materials between the augers is limited. It is sometimes observed, for example, that materials in the front auger area stay in the front of the mixing chamber, while materials in the back auger area stay in the back.

Another disadvantage of having identical augers in the same mixer is that the auger nearest the discharge opening cannot be adjusted for a faster cleanout without effecting the performance of the other auger(s). In other words, an auger optimized for mixing the feed is not the best design for discharging the feed.

Another disadvantage of having identical augers is that the augers should be rotated at the same speed for optimal mixing performance. Some drive systems would favor two different rotational speeds if the augers could be made to perform at these different speeds.

Another disadvantage of having identical augers is that the rotational direction of the augers must be the same. Some drive systems, such as a gear drive, would favor rotating the augers in opposite directions.

Another disadvantage of having identical augers is that it can set up a rocking action of the mixer as the feed moves in a predictable motion. This occurs even when the identical augers are rotated out of time from each other. The rocking is a disadvantage because of additional stresses applied to the frame and tongue members, plus potential loss of control while the mixer is being towed.

Another disadvantage of identical augers is that the rocking action created causes inaccuracies in the scale systems used to measure the weight of the feed materials. Accurate measurements of the amounts of feed mixed and discharged are critical to the health and production of both beef and dairy animals.

SUMMARY OF THE INVENTION

Accordingly, one objective of the present invention to provide a vertical mixer with at least two augers, which addresses problems associated with known devices used for mixing feed materials. Moreover, depending on the embodiment of the invention, one or more of the capabilities set forth below may be achieved:

providing a mixer which has improved interaction of the feed materials between the augers;

providing a mixer in which the auger nearest the discharge opening can be adjusted to improve the discharge action without effecting the mixing performance of the other auger(s);

providing a mixer in which the augers can be rotated at different speeds without sacrificing mixing performance;

providing a mixer in which the augers can be rotated in different directions without sacrificing performance;

providing a mixer in which the rocking action created by the feed moving in a predictable motion is reduced; and providing a mixer in which the weighing system is more stable due to the reduction of the rocking action.

In accordance with the present invention, a vertical type mixer comprises at least two augers which are dissimilar, providing an improved mixing performance. These augers can have dissimilar kickers and/or dissimilar flighting and/or can be rotated at different speeds and/or be rotated in different directions.

BRIEF DESCRIPTION OF THE DRAWINGS

These and other advantages of the invention will become more apparent and more readily appreciated from the following detailed description of the exemplary embodiments of the invention taken in conjunction with the accompanying drawings, where.

DETAILED DESCRIPTION OF THE DRAWINGS

Figure 1:
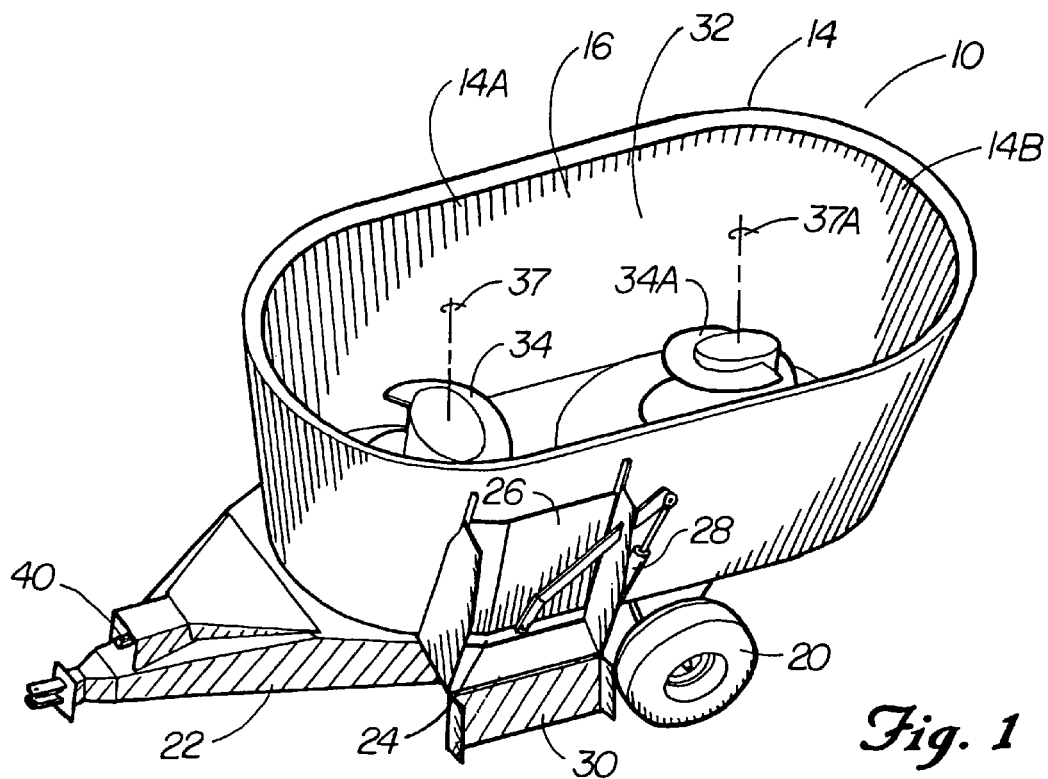
FIG. 1 is perspective view of a vertical feed mixer.

With reference to the drawings, a vertical feed mixer is generally designated by the reference number 10. The mixer includes a floor 12, a sidewall 14, and an open upper end 16. The mixer is mounted upon a frame 18, including wheels 20. A tongue 22 extending from the frame 18 is adapted to be hitched to a tractor or other prime mover. The sidewall 14 includes a discharge opening 24 with a discharge door 26 movable between open and closed positions by a hydraulic cylinder 28. A discharge chute 30 extends outwardly adjacent to the discharge opening 24.

Figure 2:
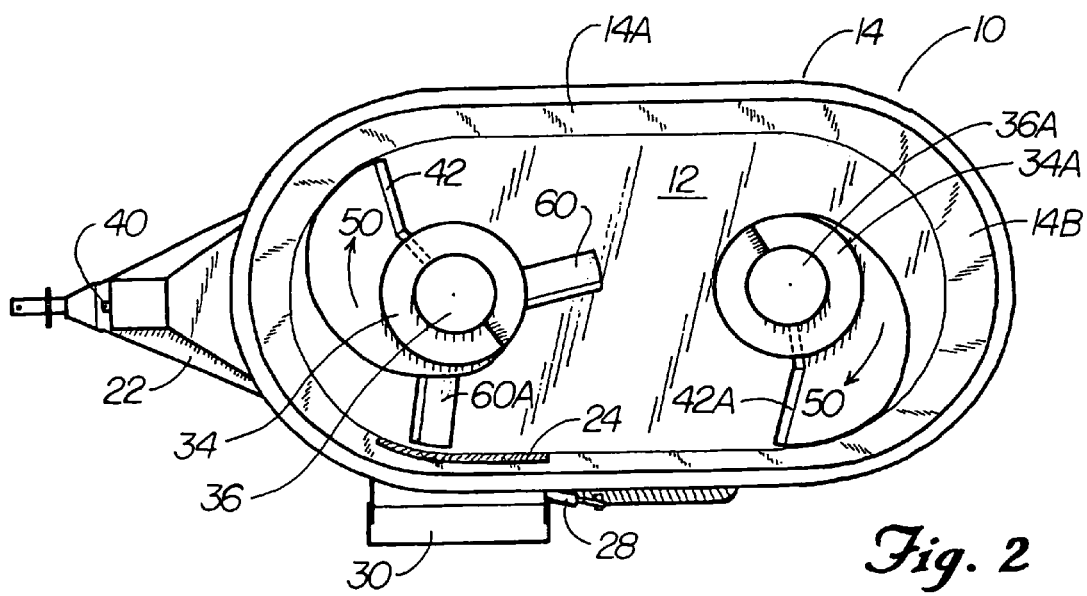
FIG. 2 is a top view of the vertical mixer shown in FIG. 1.

The floor 12 and the sidewall 14 define a mixing chamber 32. A first auger 34 is rotatably mounted within the mixing chamber 32, and includes a vertically disposed first core 36. The mixing chamber 32 includes at least a second auger 34a, which includes a vertically disposed second core 36a. The first core 36 and the first auger 34 rotate around a first substantially vertical axis of rotation 37. The second core 36a and the second auger 34a rotate around a second substantially vertical axis of rotation 37a. Helical flighting 38 is secured to and disposed coaxial with the core 36, and further helical flighting 38a is secured to and disposed coaxial with the second core 36a. A driveline 40 for rotating the augers 34 and 34a is operatively connected to the power take off (PTO) of the tractor. The sidewall 14 is oval or oblong at the top edge of the mixer 10, as shown in FIG. 2. Thus, a side 14a of the sidewall 14 is closer to the augers 34 and 34a than is an end 14b of the sidewall 14. The design of the mixing chamber 32, as well as other features of the present invention, can be, but is not limited to being, implemented similarly to the corresponding component of the Verti-Maxx vertical auger of Kuhn-Knight Inc.

Figure 3:
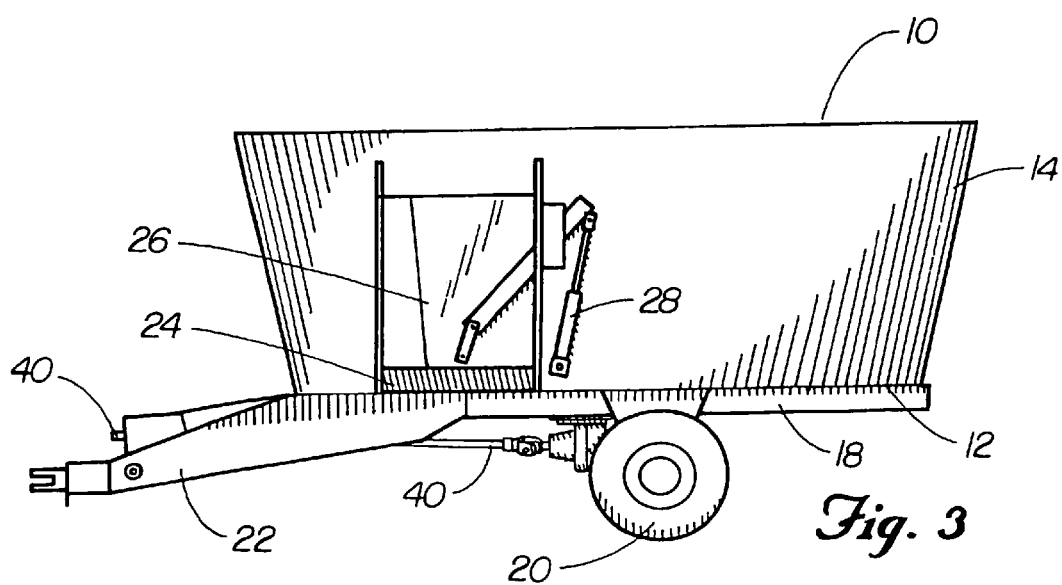
FIG. 3 is a side view of the vertical mixer shown in FIG. 1.

As shown in FIGS. 1 and 2, there is an unobstructed mixing area between the augers 34 and 34A and the floor 12. As shown in FIGS. 1–3, a drive system, including a driveline 40 connects to the augers 34 and 34A through the floor. The drive system is configured to rotate the augers 34 and 34A via connection to a tractor power take-off. As shown in FIGS. 1 and 3, a discharge opening 24 in the sidewall 14 has a door 26 with a regulatable cross-section. As shown in FIGS. 1 and 2, auger 34 has at least two kickers, 60 and 60A, and auger 34A has fewer kickers than does auger 34. As between augers 34 and 34A, auger 34 is the closest to the discharge opening 24.

Figure 4:
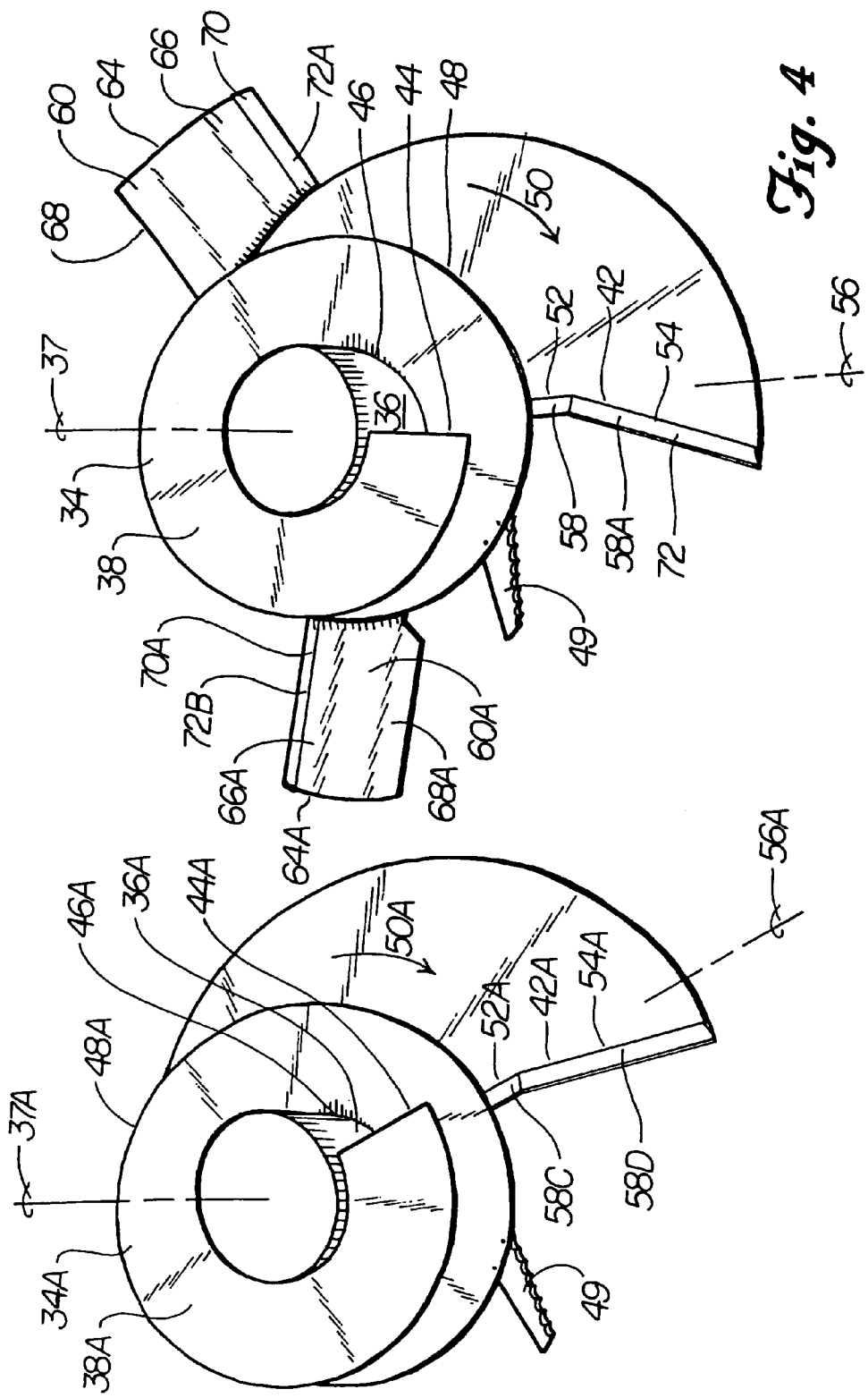
FIG. 4 is a perspective view of the vertical mixer auger shown in FIGS. 1, 2, and 3.
Figure 5:
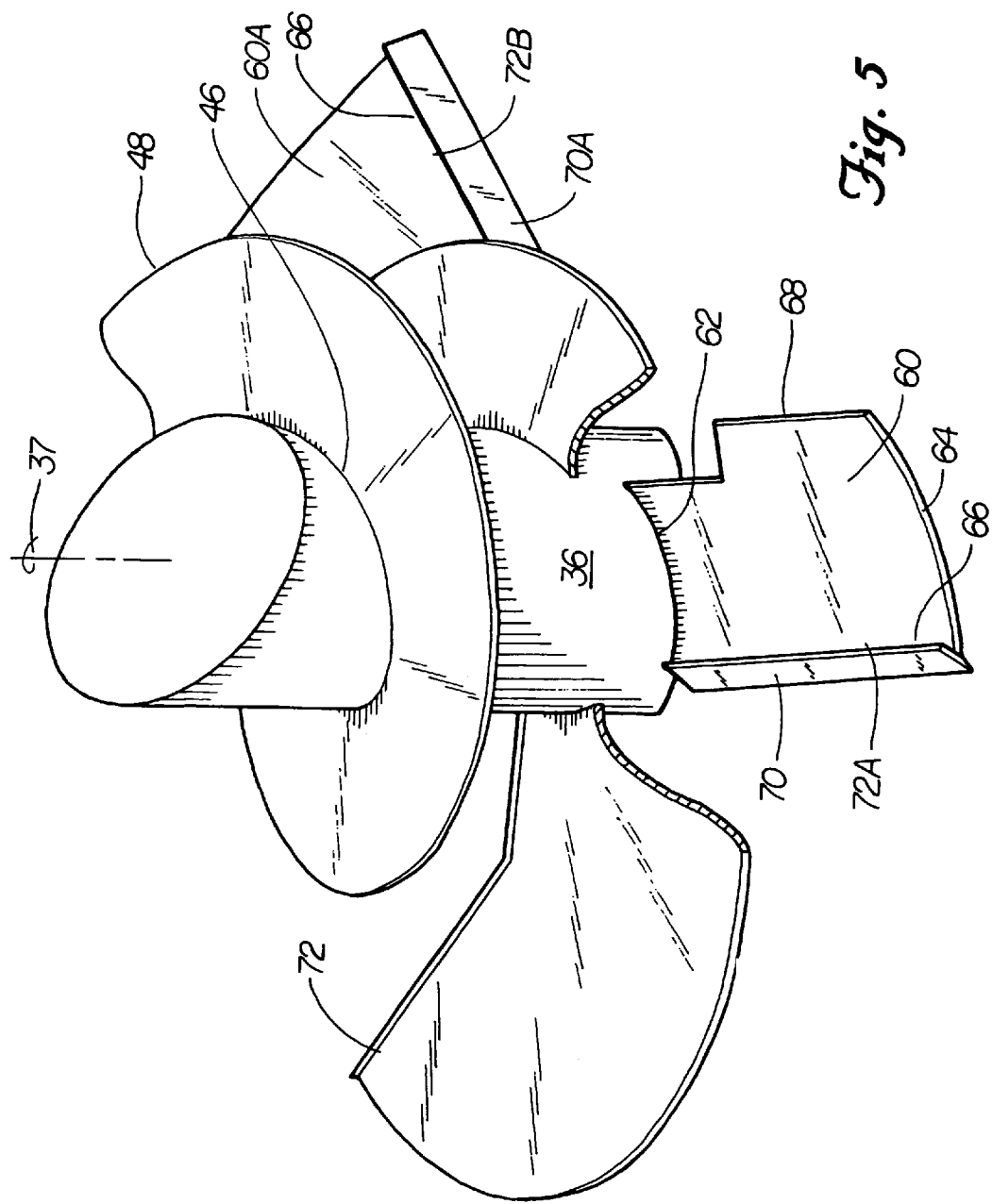
FIG. 5 is a perspective view of the kicker shown in FIG. 4.

As shown in FIG. 4, the helical flighting 38 has a leading edge 42 and a trailing edge 44. The leading edge 42 is adjacent to the floor 12 during normal operation. The helical flighting 38 also has an inside edge 46 which is secured to the core 36, and an outside edge 48. The outside edge 48 often has knives 49 attached, which facilitates the cutting of materials placed inside the mixing chamber 32. The auger 34 rotates in a direction of rotation 50 around the axis of rotation 37.

The leading edge 42 of the helical flighting 38 has an inner edge 52 and an outer edge 54. The inner edge 52 of the leading edge 42 is adjacent to the core 36, and is normally parallel with a radius line 56 extending from the axis of rotation 37. The outer edge 54 of the leading edge 42 is adjacent to the inner edge 52, and is at an angle forward of the inner edge 52 in the direction of rotation 50.

The helical flighting 38a has a leading edge 42a and a trailing edge 44a. The leading edge 42a is adjacent to the floor 12 during normal operation. The helical flighting 38a also has an inside edge 46a which is secured to the core 36a, and an outside edge 48a. The outside edge 48a often has knives 49 attached, which facilitates the cutting of materials placed inside the mixing chamber 32. The auger 34a rotates in a direction of rotation 50a around the axis of rotation 37a.

The leading edge 42a of the helical flighting 38a has an inner edge 52a and an outer edge 54a. The inner edge 52a of the leading edge 42a is adjacent to the core 36a, and is normally parallel with a radius line 56a extending from the axis of rotation 37a. The outer edge 54a of the leading edge 42a is adjacent to the inner edge 52a, and is at an angle forward of the inner edge 52a in the direction of rotation 50a.

A grader bar made of hardened or abrasion resistant steel is sometimes welded or bolted to the leading edges 42 and 42a to increase the durability of the leading edges 42 and 42a. An inner grader bar 58 is attached to the inner edge 52 of the leading edge 42, and an outer grader bar 58a is attached to the outer edge 54 of the leading edge 42. A further inner grader bar 58c is attached to the inner edge 52a of the leading edge 42a, and a further outer grader bar 58d is attached to the outer edge 54a of the leading edge 42a.

A kicker 60 has an inner portion 62 and an outer portion 64. The inner portion 62 is adjacent to the first core 36. The kicker 60 also has a leading portion 66 and a trailing portion 68. A beveled grader bar 70 is sometimes welded or bolted to the leading portion 66 of the kicker 60 to increase the durability of the leading portion 66.

A further kicker 60a has a further inner portion 62a and a further outer portion 64a. The further inner portion 62a is adjacent to the core 36. The further kicker 60a also has a further leading portion 66a and a further trailing portion 68a. A further beveled grader bar 70a is sometimes welded or bolted to the further leading portion 66a of the further kicker 60a to increase the durability of the further leading portion 66a.

The first auger 34 includes the leading edge 42, the leading portion 66, and the further leading portion 66a, which comprise a plurality of front edges 72, 72a, and 72b.

Operation

In operation, hay or other long stemmed forages in the form of large round or square bales are added into the mixing chamber 32 while the augers 34 and 34a are rotating. The knives 49 on the augers 34 and 34a cooperate with the sidewall 14 to cut the bulky hay into shorter lengths for feeding to the livestock. Additional feed materials including grains, silage, and other feed supplements are then added into the mixing chamber 32, and mixed with the hay. Due to the oblong shape of the mixing chamber 32, the hay and other feed material tends to migrate downward at the ends 14b of the sidewall 14 and migrate upward adjacent the opposite sides 14a of the mixing chamber 32. This upward and downward flow of the hay and other feed material, together with the rotation of the augers 34 and 34a provides a thorough mixing action. During this mixing action, the discharge door 26 is closed so that no feed material is discharged through the discharge opening 24.

As the second auger 34a rotates, a portion of the material being mixed is swept up by the leading edge 42a towards the inner edge 52a and upwards toward the trailing edge 44a, while a portion of the feed floats over the flighting 38a and back onto the floor 12. The material left on the floor 12 remains stationary until it is again swept up by the leading edge 42a.

As the first auger 34 rotates, a portion of the material being mixed is likewise swept up by the leading edge 42 towards the inner edge 52 and upwards toward the trailing edge 44, while a portion of the feed floats over the flighting 38 and back onto the floor 12. However, the kicker 60 and further kicker 60a sweep up the material before the leading edge 42 makes a full revolution, causing the feed to be lifted and urged in a direction of rotation 50. Thus the plurality of front edges 72, 72a, and 72b cooperate to urge the feed material in a different manner than the single leading edge 42a of the second auger 34a.

At the completion of the mixing operation, the hydraulic cylinder 28 is actuated to open the door 26 so that feed materials can be discharged out of the discharge opening 24. The rotation 50 and 50a of the augers 34 and 34a in combination with centrifugal force helps to push the feed materials out of the discharge opening 24 and onto the discharge chute 30 for delivery to the livestock feeding bunk or trough (not shown). The speed of the rotating augers 34 and 34a is normally around 24–45 revolutions per minute, but can be increased at the end of the load to discharge the feed materials more efficiently.

Accordingly, the vertical mixer includes at least two augers, which are not identical. These dissimilar augers provide an improved interaction of the feed materials that flow around and between the augers. In addition, this feature allows the adjustment of the individual augers designs to improve the discharge action without compromising the overall mixing performance. The augers can also be designed to rotate different speeds, to improve the material movement and discharge efficiency, typically with the discharge auger turning faster. The augers can also be designed to rotate different directions, to improve the material movement inside the mixer. The dissimilar augers also help to reduce the rocking action caused by identical augers, and provide a more stable scale system for weighing the materials being mixed.

While the illustrated embodiments of the augers show the augers to be centered between the sidewalls, the augers need not be so aligned. The augers may be placed on opposite sides of a centerline of the sidewalls without departing from the scope of the present invention.

The number of vertical augers is also not limited to the illustrated two augers. Three or more augers may also be utilized. In such a configuration, the at least three augers may either be co-linear or not co-linear.

Although the description above contains may specifics, these should not be construed as limiting the scope of the invention but as merely providing illustrations of some of the presently preferred embodiments of this invention. Thus the scope of the invention should be determined by the appended claims and their legal equivalents, rather than by the examples given. From the foregoing, it can be seen that the present invention accomplishes at least all of the stated objectives.

What is claimed is:

1. A vertical feed mixer apparatus, said apparatus comprising;
   a first auger rotatable around a first substantially vertical axis of rotation;
   a second auger rotatable around a second substantially vertical axis of rotation spaced apart from said first auger,
   said first and second augers being dissimilar relative to each other;
   a mixing chamber having a floor, feed inlet opposite the floor, and a sidewall and forming an unobstructed mixing area between the first and second augers and said floor; and
   a drive system configured to drive said first and second augers through said floor; and
   an opening in the sidewall with a regulatable cross-section.

2. The feed mixer apparatus of claim 1 wherein, of said first and second augers, said first auger is closest to the regulatable opening and comprises at least two kickers, and said second auger has fewer kickers than said first auger.

3. The feed mixer apparatus of claim 1 wherein said first auger includes a first helical fighting;
   said second auger includes a second helical fighting;
   said first and second helical flightings being dissimilar.

4. The feed mixer apparatus of claim 1 wherein said first auger includes a first set of knives;
   said second auger includes a second set of knives;
   the quantity of knives included in the first and second sets being dissimilar relative to each other.

5. The feed mixer of claim 1 wherein said first and second augers each include a helical fighting;
   said fighting including a leading edge;
   said first auger including a kicker;
   said kicker including a leading portion;

said leading edge and leading portion defining a plurality of front edges; and said quantity of front edges of said first auger being greater than the second auger.

6. A vertical feed mixer apparatus comprising:
a frame;
a mixing chamber having a floor, feed inlet opposite the floor, and a sidewall;
a first auger and a second auger mounted within the mixing chamber;
a drive system configured to drive said first and second augers through said floor, wherein a space between the first and second augers forms an unobstructed mixing area; and
an opening in the sidewall with a regulatable cross-section, said first and second augers each comprising:
a core;
helical fighting secured to and disposed coaxial with said core;
said helical fighting having a leading edge;
said auger rotatable around a substantially vertical axis of rotation; and
said augers being dissimilar relative to each other.

7. The feed mixer apparatus of claim 6 wherein, of said first and second augers, said first auger is closest to the regulatable opening and comprises at least two kickers, and said second auger has fewer kickers than said first auger.

8. The feed mixer apparatus of claim 6 wherein said first auger includes a first helical fighting;
said second auger includes a second helical fighting;
said first and second helical flightings being dissimilar.

9. The feed mixer apparatus of claim 6 wherein said first auger includes a first set of knives;
said second auger includes a second set of knives;
the quantity of knives included in the first and second sets being dissimilar relative to each other.

* * * * *